Inventor
ROGER CHARLES LEON CROMMEN

By Toulmin & Toulmin
Attorneys

*Inventor*
ROGER CHARLES LEON CROMMEN
By Toulmin & Toulmin
*Attorneys*

Jan. 30, 1962 R. C. L. CROMMEN 3,019,359
SMALL SELF-STARTING SYNCHRONOUS MOTORS
HAVING A HIGH POWER-TO-WEIGHT RATIO
Filed April 13, 1959 3 Sheets-Sheet 3
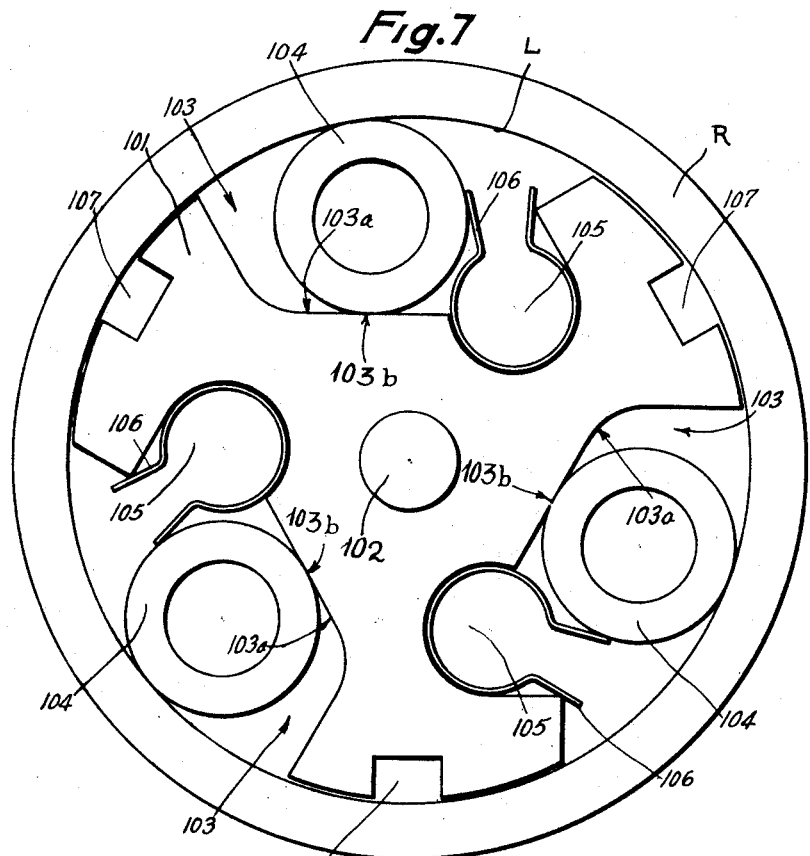
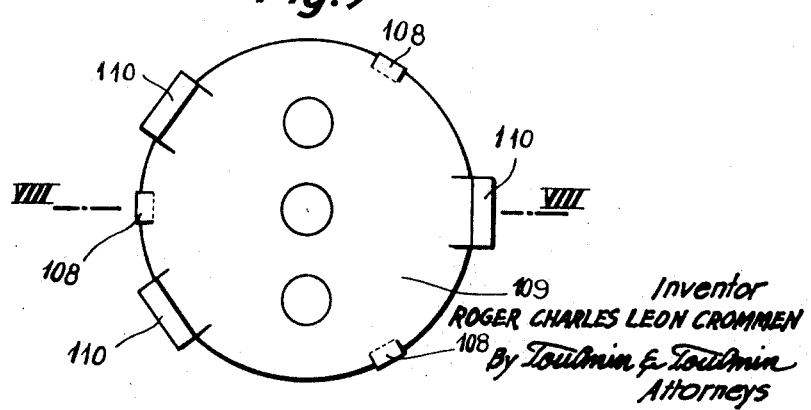
Inventor
ROGER CHARLES LEON CROMMEN
By Toulmin & Toulmin
Attorneys 3,019,359
Patented Jan. 30, 1962

3,019,359
SMALL SELF-STARTING SYNCHRONOUS MOTORS HAVING A HIGH POWER-TO-WEIGHT RATIO
Roger Charles Leon Crommen, Valence (Drome), France, assignor to Compagnie Crouzet, Valence (Drome), France, a company of France
Filed Apr. 13, 1959, Ser. No. 806,094
Claims priority, application France Apr. 18, 1958
2 Claims. (Cl. 310—156)

The present invention relates to small self-starting synchronous motors adapted to be fed with currents having industrial frequencies ranging up to 1000 cycles and provides improvements in the type of motor comprising a rotor constituted by a permanent magnet rotating in a stator cage and advantageously associated with an anti-return device preventing the rotor from rotating in the opposite direction to the rotating field. The improvements of the invention have more particularly for object to afford, among others, the following advantages: the motor is effectively sealed and protected; a convenient changing of the exciting coil or coils; instantaneous starting in all positions of the rotor with a torque in the neighbourhood of the break-off torque; rotation in a single direction without vibrations for utilization voltages, which vary by ±20% relative to the rated voltage; permissible permanent over voltages of about 50%; permanent operation possible in an ambient temperature of 100° C. without deterioration and without great loss of power; silent operation without maintenance for several years; great ease of mounting with possibility of reversing the direction of rotation of the output shaft of the motor without need to modify the latter; very low cost price, etc.

The aforementioned results are obtained not only by a judicious choice of the material of which the motor is composed, but above all by an original arrangement and mounting of the rotor and by a special arrangement of an anti-return device allowing rotation of the rotor only in the preferred direction.

A first improvement, which relates to the rotor comprising a permanent magnet, is characterized in that this magnet is in the form of a ring having a substantially rectangular cross-sectional shape and a cylindrical outer face, this ring being obtained by the sintering of cobalt ferrite or barium ferrite whose magnetic properties are as follows: remanent induction $B_2$ at least equal to 2000 gauss, the coercive field at least equal to 1600 oersteds, the differential permeability being about 2.

The large value of the coercive force of this material is the cause of the second improvement characterized in that the ferrite ring is magnetized on its periphery in such manner that there are produced on its outer cylindrical face pairs of poles which are alternately north and south, the number of pairs of poles being equal to the number of pairs of poles of the entire of the stator.

As the physical characteristics of barium and cobalt ferrites are those of ceramics, the process (sintering) employed in the production of the annular magnets results in that these elements can only be obtained with very wide manufacturing tolerances (about a half millimetre for a rotor diameter of about 25 millimetres). The problem facing the manufacturer is therefore that of the incorporation, at low cost, in a precise mechanical unit, of annular magnets whose shape and dimensions are but little precise in production and whose material (barium or cobalt ferrite) is fragile and very hard. This problem has been solved in accordance with another improvement provided by the invention.

According to this improvement, there are provided on each lateral face of the annular magnet and spaced 120° apart from one another three inclined planes which protrude from a circular chamfer and face three inclined planes formed on the other face of the magnet, the angle formed between each plane and a radial plane being such that the variations in the diameter of the ring substantially compensate the variations in thickness, the magnet, whose cylindrical face has its diameter rectified or trued up by a grinding operation to the precise dimension, being mounted on the shaft of the rotor through the medium of two circular members which are keyed on said shaft and each of which coming into point contact with each of the three inclined planes of one face of the magnet.

The rectification by grinding of the outer cylindrical face of the annular magnet of the rotor is the sole operation required to be effected on this member, which considerably decreases the cost of machining the rotor.

In a preferred embodiment of the aforementioned improvement, the latter is characterized by the fact that one of the two circular members used in the mounting of the annular magnet is a cup-shaped rigid member which is a drive fit on the shaft of the rotor whereas the other mounting member is an elastic washer fixed to a ring which is a drive fit on said shaft.

The cup advantageously serves to receive the anti-return device which, according to the invention, comprises a plate which is stationary as concerns rotational motion and is perpendicular to the shaft of the motor with which it is coaxial, said plate having on its periphery ramps on which are disposed rollers which are subjected to the action of springs biasing these rollers toward the high part of the ramps and co-operate with the inner cylindrical face of the housing provides in the cup.

In an advantageous embodiment of the aforementioned device, the latter possesses the following features and combinations thereof:

A. The ramps (with the corresponding rollers) are three in number and are arranged and spaced apart angularly at 120° to one another to obtain a judicious distribution of the blocking forces, so that there is no reaction on the central shaft and the reproduction of oscillations, whose frequency is a multiple of the number of poles, is eliminated as far as possible.

B. The zones of the ramps, where the rollers are generally held, are situated on a circumference whose radius is substantially equal to the diameter of the rollers so that each roller benefits from a maximum support surface for a minimum gripping force.

C. The rollers, which are hollowed out, are arranged in such manner as to provide a certain elasticity so that a deformation of the rollers could occur at the wedging moment and there is a restoration of energy in the direction of the preferred rotation.

D. All the elements of the anti-return device are composed of a metal whose strength is greater than 200 kg./sq. mm.

Further features and advantages of the invention will be apparent from the ensuing description of one embodiment of a motor improved in accordance with the invention, which embodiment has been given solely by way of example and shown diagrammatically in the accompanying drawings, in which:

FIG. 7 is a plan view of the anti-return device on an enlarged scale;

FIG. 8 is a sectional view, on a reduced scale, taken along line II—II of FIG. 9, of the cover of the anti-return device, and FIG. 9 is a plan view of said cover.

Figure 1:
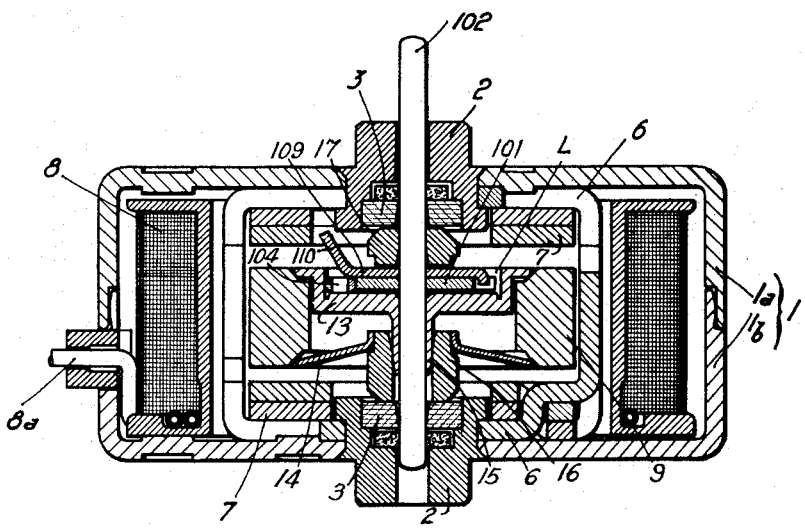
FIG. 1 is an axial sectional view of the motor unit on a large scale.

The synchronous motor shown in the drawings comprises a housing 1 which can be taken apart and has two parts 1a and 1b composed of ferromagnetic metal and fitted one inside the other so as to constitute an effective casing. The transverse walls of the two parts of the housing carry the bearing blocks 2 in which are disposed the bushings or bearings 3 in which the shaft 102 of the rotor is journalled, said rotor being described hereinafter.

Fixed against the inner flat part of each half housing is the plane back part of a semi-stator.

Figure 2:
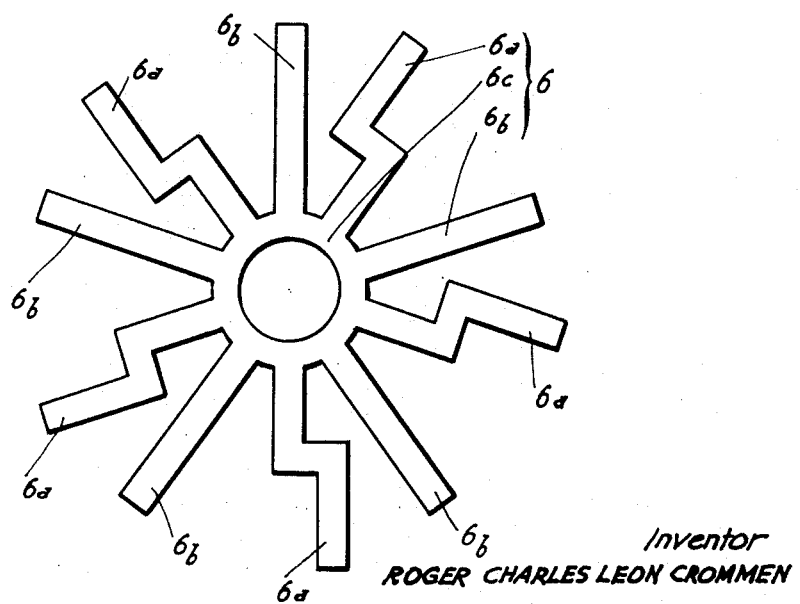
FIG. 2 is a plan view of a star before its branches have been bent, the star being composed of a ferro-magnetic material adapted to constitute a semi-stator.

Each semi-stator is constituted (see FIG. 2) by a star 6 having five pairs of branches 6a and 6b cut in one piece with the body or ring 6c in a pure iron sheet alloyed with 4% of silicon. These branches subsequently constitute the bent main polar arms 6a and the dephased rectilinear polar arms 6b. In the apparatus the aforementioned branches are folded in the manner shown in FIGS. 1 and 3.

The part of each semi-stator composed of ferromagnetic material is associated with a dephasing ring 7 composed of solid copper provided with five openings 7a distributed on a circumference and providing five radial corrugations or undulations extending from each opening toward the periphery.

The members 6 and 7 are assembled in the following manner:

The rectilinear arms 6b are folded at a right angle at a certain distance from their origin so that the five rectilinear arms in question (which are now parallel with one another) can be fully engaged in the openings 7a of the ring 7, the arms 6b being placed in the recesses of the corrugations of the ring.

Figure 3:
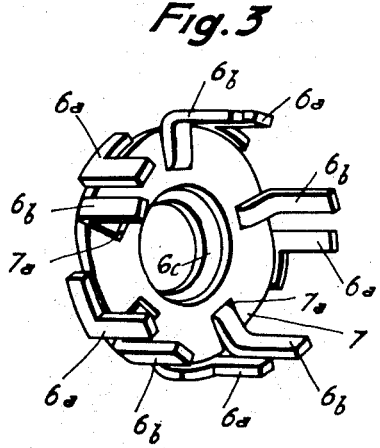
FIG. 3 is a perspective view showing a semi-stator composed of the star shown in FIG. 2 (the branches having been bent and provided with a dephasing ring)

Thereafter, the five rectilinear arms 6b are folded outwardly, after which all the arms 6a and 6b are folded in such manner that their ends are parallel with one another and their inner faces are substantially flush with a cylindrical surface containing the periphery of the ring (FIG. 3).

In actual fact, for the purpose of taking into account the weakening of the dephased flux in each arm 6b, each of these arms is folded in such manner as to leave, between the arm and the rotor, an air gap which is less than that existing between the rotor and the non-dephased arms 6a so that the dephased flux is finally of the same order of magnitude as the normal flux.

The off-setting between the main arms and the dephased arms is about a quarter of a pole pitch.

Tests have demonstrated that in such an arrangement the dephasing reaches values of about 30°, which creates an elliptical rotating field ensuring a great dissymmetry in the driving torque between the positive direction and the negative direction of rotation. A dephasing of this magnitude ensures a very definite starting, in a preferential direction, and substantially eliminates the vibrations to be observed in similar motors in the course of operation.

Disposed in the motor in facing relation are two assemblies 6—7 similar to that just described and interlaced one inside the other by the polar arms. Thus the motor comprises ten pairs of polar arms surrounded by an exciting coil 8 whose connecting conductors 8a pass near the joint plane of the two half-housings 1a and 1b.

Figure 4:
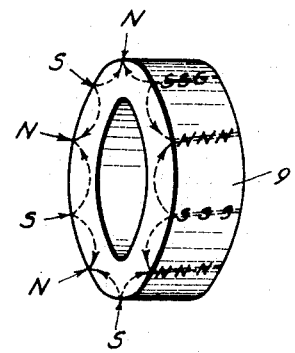
FIG. 4 is a perspective view of an annular magnet showing the disposition of the poles on the cylindrical surface of this magnet.

The rotor comprises (FIG. 4) an annular magnet 9 composed of cobalt or barium ferrite having a remanent induction equal to, or greater than, 2000 gauss, a coercive field equal to, or greater than, 3600 oersteds and a differential permeability equal about 2. The high value of the coercive force of the material constituting the annular magnet permits forming, on the outer cylindrical surface of the magnet, small magnetized zones having alternating polarities, which zones are distinctly defined by the shape of the magnetic circuit employed for magnetizing the magnet. The latter could be mounted in the motor without need to provide metal polar elements. Such a magnet could be handled (in particular in the course of mounting) without any risk of demagnetization.

Further, such a magnet has its optimum operation point (maximum BH) when the air gap between the rotor and the stator is relatively large (0.5 mm.), which facilitates the construction and the mounting of the motor in mass-production, resulting in a reduced cost price and increased efficiency and power-to-weight ratio of the motor.

It is known that the physical characteristics of ferrites of the type employed are those of ceramics. The manufacturing process used for obtaining annular magnets (powder sintering) only permits obtaining these magnets, straight from the sintering operation, with very wide manufacturing tolerances of about 0.5 mm.

Figure 5:
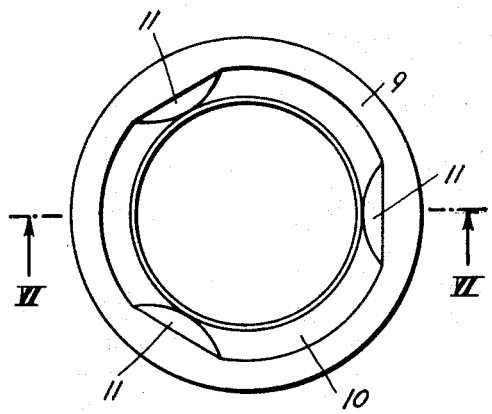
FIG. 5 is a plan view of the annular magnet of the motor shown in FIG. 1.
Figure 6:
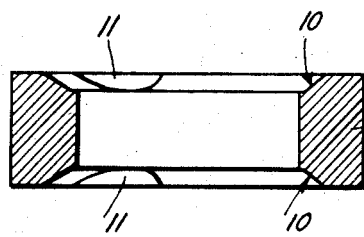
FIG. 6 is a sectional view taken substantially along line VI—VI of FIG. 5.

In order to incorporate, in a very precise mechanical unit, a magnet whose shape and dimensions are ill-defined and whose material is both hard and fragile, the following procedure is adopted:

The magnet, obtained straight from the sintering operation in the form of a ring 9 whose cross-sectional shape is substantially rectangular, has (see in particular FIGS. 5 and 6) on each face thereof an inner chamfer 10 which makes an angle of about 30° with a radial direction. Disposed on each of these chamfers at 120° apart, are three protruding inclined planes 11. Each of these planes makes an angle of about 40° with a radial direction. It is the three inclined planes 11 provided on each side of the ring which are used in the rectification of the outer cylindrical surface of the ring 9 and for the mounting of the ring on the shaft 102 with a centering of the aforementioned outer cylindrical surface relative to said shaft.

The sintering operation creates large shrinkages which vary between 18 and 22%. These shrinkages are different in the direction of the compression of the ferrite powder to those in the direction perpendicular to the compression (during the moulding operation). The dimensional variations in the members are above all due to variations in shrinkage resulting from the differences in the compression filling in the mould. The variations in the shape of the members (ellipsoid, truncated cone, etc.) are caused by unequal baking temperatures surrounding the members.

The result is that the dimensional variations in the direction of the compression and perpendicular to the latter are proportional to the shrinkage. The angle of the three inclined planes 11 located on each face of the annular magnet is so chosen that the variation in diameter compensate the variations in thickness, so that two planes, each of which intersects the three points of contact between three inclined planes and a circular member having precise dimensions, remain spaced apart from one another a distance which varies but little from one magnet to another when the dimensions of the magnets vary greatly.

This feature is exploited in the rectification by grinding of the outer cylindrical surface of the magnets.

This rectification is effected in mass-production on a mounting anvil comprising a shouldered shaft provided with two centering cones and an elastic gripping device tending to urge one of the cones toward that cone which bears against the shoulder of the shaft. Slidable on the shaft are circular spacer members whose periphery comprises a toric portion. The magnets are spaced on this mounting anvil in such manner that each one is inserted between two spacer members, which bear by their toric portion against the three inclined planes 11 protruding from the chamber 10. This arrangement provides an excellent centering and permits proceeding to the grinding of the outer cylindrical surface 12 of the annular magnets mounted on the anvil.

Thus the machining of the magnets is reduced to the minimum, while ensuring a good centering.

The annular magnet thus produced of which only the outer cylindrical surface is brought to a precise dimension, is mounted in the following manner on the shaft 102 of the motor:

The magnet 9 is gripped between, on the one hand, a rigid steel cup 13 which has its periphery in contact at three points with the three inclined planes located on one side of the magnet and, on the other hand, an elastic washer 14 whose periphery is in contact at three points with the three inclined planes on the other side of the magnet.

The cup 13 is rigid with a tubular portion 15 fitted on the shaft 102, whereas the washer 14 is fixed to a ring 16 of hard alloy, the bore of the ring tightening the tubular portion 15 on the shaft 102.

The mounting is carried out by means of a mounting tool having a cylindrical bore corresponding to the diameter of the rectified annular magnet so as to center on the latter. In this tool, there is placed in the following order, the shaft 102, the ring 16 with the washer 14, the annular magnet 9, the cup 13 with its tubular portion 15 (sliding on the shaft 102) and the anti-return device which will be described hereinafter.

The upper part of the tool bears in the course of the axial clamping against the anti-return device and forces the tubular portion 15 of the cup 13 into the bore of the ring 16 which bears against an abutment of the tool. The washer 14 is deformed in contact with the magnet and maintains it clamped against the cup 13.

The manufacturing tolerances of the shaft 102, the tubular portion 15, the cup 13 and the ring 16 are such that the axial clamping operation causes the clamping or tightening of the portion 15 on the shaft 102.

The mounting operation interconnects or renders integral the shaft 102, the cup 13, the magnet 9, the washer 14 and the ring 16.

The space between the upper part of the anti-return device and the lower end of the ring 16 is determined by the mounting tool and is very precise. The washer 14 compensates by its deformation the variations in thickness of the magnet 9.

Further, the support points of the cup 13 and of the washer 14 are the same as those used for holding the magnet in position in the course of its rectification. The magnet tends in consequence to center itself on the shaft in the course of the mounting of the rotor. However, the guiding afforded by the bore of the mounting tool on the cylindrical outer surface of the magnet facilitates the centering of the latter.

The direction of rotation of the motor is not exactly determined by the rotating field. This is why an anti-return device is provided to prevent the motor starting up in the opposite direction to that of the rotating field. The anti-return device is, as mentioned hereinbefore, disposed in the housing L of the cup 13 and comprises (see FIGS. 7 to 9) a plate 101 which has a generally circular shape and is centered on the shaft 102 of the rotor, which shaft is freely rotative in the corresponding bore of the plate.

Provided on the periphery of the plate 101 are three identical recesses 103 which are spaced 120° apart, each recess having a base constituting a ramp 103a on which rolls a roller 104 adapted to cooperate with the inner cylindrical face of the housing L.

The lower end of each ramp communicates with an aperture 105 adapted to receive a generally V-shaped spring 106 which acts on the corresponding roller 104 so as to urge it to rise up the ramp 103a and remain permanent contact with said inner cylindrical face.

Owing to the angular spacing between the recesses 103 and roller 104 and to the number of the latter, there is obtained a judicious distribution of the forces and the elimination of reactions on the shaft 102, the central bore of the plate 101 having a certain play on the shaft. Further, with three rollers the creation of oscillations, having a frequency which is a multiple of the number of poles, is avoided as far as possible.

The zones 103b of the ramps 103a in which the rollers 104 are held are advantageously located on a circumference whose radius is in the neighborhood of the diameter of the rollers so that the rollers and the ramps bear against one another on the maximum surface (for a minimum force).

Each of the rollers 104 is in fact an elastic or resilient ring so that it is capable of being deformed at the moment of wedging (when the rotor tends to rotate in the wrong direction) and of restoring (when the rotor tends to rotate in the correct direction) the energy stored during said wedging.

In order to prevent the plate 101 from rotating, the latter comprises on its periphery notches 107 engaged with lugs 108 of a cover 109 (FIGS. 8 and 9) which has a generally circular shape and comprises three tabs 110 adapted to be inserted in corresponding recesses in the stator.

All the members of the anti-return device are composed of metal having preferably a strength greater than 200 kg./sq. mm.

When the rotation of the cup tends to drive the rollers 104 in the direction in which they compress the springs 106, the ramps 103b are disengaged and the rotation occurs without wedging.

In the opposite direction of rotation, the rollers have a tendency to be wedged between the cylindrical face of the cup and the ramps, which holds the cup stationary relative to the plate 101.

When the rotor is being mounted in the stator, the tabs 110 of the cover are engaged in the recesses formed in one of the dephasing rings 7.

The anti-return unit is maintained in the housing of the cup by a single ring 17 which is composed of hard alloy and is a drive fit on the shaft 102, there being sufficient axial clearance for the rotor.

The ring 17 is put in position by a tool which determines with precision the distance between the upper end of this ring and the lower end of the ring 16. These two ends constitute shoulders limiting the axial play of the rotor unit between the two bearings 3.

A motor constructed with the aforementioned improvements and having a diameter of 50 mm., a thickness of 22 mm. and consuming 3.5 watts for a voltage of 110 v., has an available mechanical power (at break-off) of 60 g./cm. at 600 r.p.m. (0.375 w.).

This is a substantial improvement over similar motors of known type as concerns mechanical power and efficiency.

It will be understood that the example, described hereinbefore and shown in the accompanying drawings, of the motor improved in accordance with the invention, has been given merely by way of example to which the invention is in no way restricted, many modifications and changes being possible in this example without departing from the scope of the invention as defined in the appended claims.

What I claim is:

1. In a self-starting synchronous motor comprising: a stator including polar elements spaced apart circumferentially; an excitation coil surrounding said polar elements; and a rotor rotating in said stator, said rotor comprising a shaft, an annular permanent magnet having a substantially rectangular cross-sectional shape and comprising on each of its two lateral faces three planes inclined relative to a radial plane, a rigid cup fixed on said shaft the periphery of said cup being in point contact with each of the three inclined planes located on the same side of the magnet, and an elastic washer fixed on said shaft and having its periphery bearing elastically against each of the three inclined planes located on the side of the magnet opposite that on which said cup is located.

2. A self-starting synchronous motor as claimed in claim 1, wherein the rigid cup comprises a cylindrical hub fitted on the shaft, whereas the elastic washer is rigid with a ring of hard material which is forced on said hub so as to tighten the latter on said shaft.

References Cited in the file of this patent

UNITED STATES PATENTS

| | | |
|---|---|---|
| 1,976,880 | Graseby | Oct. 16, 1934 |
| 2,212,192 | Howell | Aug. 20, 1940 |
| 2,515,295 | Davis | July 18, 1950 |
| 2,699,239 | Klonoski | Jan. 11, 1955 |